United States Patent
Irth et al.

(10) Patent No.: US 8,370,024 B2
(45) Date of Patent: Feb. 5, 2013

(54) METHOD FOR DETECTING THE DIRECTION OF TRAVEL OF A MOTOR VEHICLE

(75) Inventors: Markus Irth, Mainz-Kastel (DE);
Martin Grieβer, Eschborn (DE);
Andreas Köbe, Bensheim (DE); Frank Schreiner, Friedrichsdorf (DE);
Christian Suβmann, Oberursel (DE);
Daniel Fischer, Schwalbach (DE)

(73) Assignee: Continental Teves AG & Co. oHG (DE)

( * ) Notice: Subject to any disclaimer, the term of this patent is extended or adjusted under 35 U.S.C. 154(b) by 488 days.

(21) Appl. No.: 12/666,886

(22) PCT Filed: Jun. 2, 2008

(86) PCT No.: PCT/EP2008/056791
§ 371 (c)(1),
(2), (4) Date: Dec. 28, 2009

(87) PCT Pub. No.: WO2009/003777
PCT Pub. Date: Jan. 8, 2009

(65) Prior Publication Data
US 2010/0185361 A1    Jul. 22, 2010

(30) Foreign Application Priority Data
Jun. 29, 2007    (DE) .................. 10 2007 030 431

(51) Int. Cl.
*A01B 69/00*    (2006.01)

(52) U.S. Cl. ................... 701/41; 701/29.2; 701/31.4

(58) Field of Classification Search ........... 701/29.2, 701/29.7, 31.4, 41
See application file for complete search history.

(56) References Cited

U.S. PATENT DOCUMENTS

| | | | |
|---|---|---|---|
| 5,436,831 A | 7/1995 | Erhardt et al. | |
| 5,977,765 A | 11/1999 | Gibson et al. | |
| 6,044,320 A | 3/2000 | Stuible et al. | |
| 6,446,018 B1 | 9/2002 | Isermann et al. | |
| 6,747,553 B2 | 6/2004 | Yamada et al. | |
| 6,763,294 B2* | 7/2004 | Mason et al. | 701/43 |
| 7,392,122 B2* | 6/2008 | Pillar et al. | 701/48 |
| 7,756,621 B2* | 7/2010 | Pillar et al. | 701/41 |
| 2003/0045982 A1* | 3/2003 | Kondo et al. | 701/41 |

(Continued)

FOREIGN PATENT DOCUMENTS

| | | |
|---|---|---|
| DE | 4038284 A1 | 6/1992 |
| DE | 4104902 A1 | 8/1992 |

(Continued)

*Primary Examiner* — Helal A Algahaim
(74) *Attorney, Agent, or Firm* — RatnerPrestia

(57) ABSTRACT

A method for detecting the direction of travel or for detecting a change in the direction of travel of a motor vehicle which has at least two wheel speed sensor arrangements which each comprise an encoder with an incremental scale and a plurality of scale graduations and a wheel speed sensor (SEa, SEb, SEc, SEd) and are connected to an electronic control unit, wherein, when a scale graduation is sensed the wheel speed sensors each transmit a speed signal to the electronic control unit, wherein the direction of travel or a change in the direction of travel is identified at least from the order in which the speed signals occur with respect to the individual wheel speed sensor arrangements. A computer program product for carrying out all the steps of the method is also disclosed.

10 Claims, 3 Drawing Sheets

U.S. PATENT DOCUMENTS

2003/0045983 A1*  3/2003  Kondo et al. .................... 701/41
2003/0208310 A1*  11/2003  Mason et al. .................... 701/43

FOREIGN PATENT DOCUMENTS

| | | |
|---|---|---|
| DE | 4223385 C2 | 1/1994 |
| DE | 19721488 A1 | 11/1998 |
| DE | 19851942 A1 | 6/1999 |
| DE | 102005016110 A1 | 10/2006 |
| DE | 102007003013 A1 | 2/2008 |
| FR | 2893141 | 5/2007 |
| GB | 2317427 A | 3/1998 |
| WO | WO02062640 A1 | 8/2002 |
| WO | WO2008009377 A1 | 1/2008 |

* cited by examiner

METHOD FOR DETECTING THE DIRECTION OF TRAVEL OF A MOTOR VEHICLE

CROSS REFERENCE TO RELATED APPLICATIONS

This application is the U.S. national phase application of PCT International Application No. PCT/EP2008/056791, filed Jun. 2, 2008, which claims priority to German Patent Application No. 10 2007 030 431.7, filed Jun. 29, 2007, the contents of such applications being incorporated by reference herein.

BACKGROUND OF THE INVENTION

1. Field of the Invention

The invention relates to a method for detecting a direction of travel or for detecting a change in the direction of travel of a motor vehicle and to a computer program product for carrying out all the steps of the method.

2. Description of the Related Art

Document DE 40 38 284 A1 describes a method for identifying the direction of rotation of an encoder, in which method the encoder is encoded with different scale graduations, specifically both large and small scale graduations. The rotational movements of the encoder are sensed by a sensor. In the course of a rotational movement of the encoder, the direction of rotation of the encoder is identified from the signal pattern of the sensor which correlates with the scale pattern of the encoder or the chronological profile of the sensor signals. Such encoding of the encoder is disadvantageous in that essentially integral multiples of one revolution of the encoder have to be used to calculate the speed of the encoder, as a result of which a speed measurement with such an encoder provides relatively poor resolution.

In document DE 197 21 488 A1, a method for compensating inaccuracies of a wheel speed sensor is proposed in which each scale graduation is assigned a correction factor which is dependent at least on the scale graduation error. This correction factor is taken into account in the speed calculation.

Document DE 41 04 902 A1 describes a method for detecting a direction of rotation in which, on the one hand, a composite signal and, on the other hand, a difference signal are formed from the output signals of two magnetic field sensor elements which are arranged offset with respect to one another in relation to an alternatingly magnetized encoder, and the direction of rotation of the encoder is determined from these signals.

SUMMARY OF THE INVENTION

An object of the present invention is to propose a method for detecting the direction of travel of a motor vehicle, wherein in particular simple low-cost wheel speed sensor arrangements can be used and/or a detection of the direction of travel can be carried out at a relatively low velocity of the vehicle. Another object of the invention is to propose a method which can identify the direction of travel of a motor vehicle essentially directly after the ignition has been activated and after a small distance has been traveled.

The invention relates to the idea of identifying the direction of travel and/or a change in the direction of travel from the order in which a speed signal occurs with respect to the individual wheel speed sensor arrangements of a motor vehicle.

A basic idea of the invention can preferably also be described as follows:

The scale graduations of the encoders of the individual wheel speed sensor arrangements of the motor vehicle are respectively sensed by a wheel speed sensor. In this context, the respective specific, relative orientation of the rotation between the encoder and wheel speed sensor differs in each wheel speed sensor arrangement. In the travel mode, the wheel speed sensor arrangements each have a different rotational angle between the wheel speed sensor and the next or the adjacent scale graduation which is to be sensed. The pattern of these different encoder positions in relation to the respective wheel speed sensor is mapped essentially by the order in which these speed signals occur in relation to the individual wheel speed sensor arrangements. Accordingly, the method according to aspects of the invention expediently proposes identifying the direction of travel or a change in the direction of travel of the motor vehicle from this order.

The method according to aspects of the invention has the advantage that the encoders in particular do not have to be encoded specifically for the detection of a direction of rotation but rather it is expediently possible to use commercially available encoders with an incremental angle scale. In addition, the wheel speed sensor preferably requires only one sensor element and no additional signal processing unit for detecting the direction of rotation, since the method is expediently used as a pure software solution which requires only at least two incrementally measuring low-cost wheel speed sensors. The method is suitable, in particular, for detecting the direction of travel at low velocities and in the case of short distances traveled, which are relevant to the detection of the direction of travel.

A speed signal is expediently understood to be a chronologically limited signal which is assigned to a scale graduation which is sensed by the sensor, and said speed signal comprises, in particular, a speed information item, and particularly preferably the speed information item is encoded by means of the duration of the speed signal. The speed signal very particularly preferably has at least one speed pulse whose duration is dependent on the speed or the rotational speed.

The term determination of the direction of travel or the determination of the direction of travel is preferably also implicitly understood to mean the detection of a possible change in the direction of travel.

The wheel speed sensor is preferably an active sensor which draws its energy in particular via its connecting lines to the electronic control unit.

It is expedient that the wheel speed sensor has at least one sensor element and a signal processing circuit. The sensor element is preferably a magneto-electric transducer element such as an AMR element, a GMR element, another magneto-resistive sensor element or a Hall element.

An encoder is preferably understood to be a machine element which has an incremental angle scale. It is possible both for, in particular, ferromagnetic gearwheels or perforated disks, which in combination with a permanent magnet generate a variable magnetic airgap, to serve as encoders, and to be an integral sequence of permanently magnetized north/south pole areas which form, in an oscillating sequence, an encoder track which is particularly preferably closed to form a circle and which is inserted, for example, in a wheel bearing seal. The encoder serves very particularly preferably as a pulse generator within the wheel speed sensor arrangement.

It is expedient that a sequence data record is generated from an information item relating to the chronological order in which the speed signals of the individual wheel speed sensor arrangements successively occur. Said sequence data record comprises, in particular, time stamp data which are respectively assigned to a chronological occurrence of a speed signal of a wheel speed sensor arrangement. The chronological order in which the speed signals occur can be acquired particularly easily and precisely from the time stamp data. Furthermore, this data format permits further processing of the data in the same way.

The sequence data record generated last is preferably stored at defined times and/or continuously in the electronic control unit.

When the direction of travel or a change in the direction of travel is identified, the data record generated last or the current data record is preferably compared with at least one preceding sequence data record. The direction of travel can be identified relatively precisely from this comparison, in particular if the additional information as to which direction of travel this preceding sequence data record is assigned is available. This additional information is stored, in particular, additionally in each sequence data record after the identification of the direction of travel.

It is preferred that the following steps are carried out in the course of an identification of a direction of travel:
  a current sequence data record is generated from the speed signals received last in the electronic control unit,
  at least one forward sequence data record, in which the data are arranged in accordance with forward travel, and at least one reverse sequence data record, in which the data are arranged in accordance with reverse travel, are generated from at least one preceding sequence data record which is stored in the electronic control unit,
  after which the current sequence data record is compared both with the at least one forward sequence data record and with the at least one reverse sequence data record, wherein in each case a correspondence characteristic variable of the current sequence data record with the at least one forward sequence data record and the at least one reverse sequence data record is calculated, and
  a process for determining the direction of travel is subsequently carried out by evaluating at least one of these two correspondence characteristic variables. In particular, the current sequence data record is subsequently stored in the electronic control unit. The direction of travel information which is determined last and which is assigned to said sequence data record is particularly preferably also stored in this sequence data record. The correspondence characteristic variables are very particularly preferably each calculated here by means of a correlation calculation between the current sequence data record and the forward sequence data record/reverse sequence data record.

When the direction of travel is determined, at least one of the following additional information items is taken into account:
  The velocity of the vehicle, wherein in particular the information that a defined minimum velocity is present is evaluated at least as an indication of forward travel, a transmission information item, in particular the information as to whether a forward gearspeed or a reverse gearspeed is engaged, a vehicle lighting information item, in particular the information as to whether the reverse light is on, a yaw rate information item, a lateral acceleration information item and/or a steering angle information item. This permits the reliability of the method to be increased and the plausibility of the identified direction of travel to be estimated.

It is expedient that in addition in each case a scale graduation error characteristic variable is assigned to a plurality of these scale graduations of the encoder of at least one wheel speed sensor arrangement by evaluating the speed signals of the sensor in an electronic control unit, wherein the direction of rotation of the at least one encoder is identified from the order of the scale graduation error characteristic variables which are assigned to the sensed scale graduations, after which at least this direction of rotation of the at least one encoder is taken into account in the determination of the direction of travel of the motor vehicle. This essentially redundant detection of the direction of travel permits the reliability of the entire method to be considerably increased. In particular, in the course of an identification of a direction of rotation of at least one encoder, scale graduation error characteristic variables are combined to form a pattern which is respectively compared with a forward rotation reference pattern and a reverse rotation reference pattern, which reference patterns are formed directly or indirectly from scale graduation error characteristic variables which are stored in the electronic control unit, wherein in each case a pattern correspondence characteristic variable of the pattern is calculated with at least a portion of one of the two reference patterns. After this, the direction of rotation of this encoder is determined from the comparison of the two pattern correspondence characteristic variables, and this at least one identified encoder direction of rotation is taken into account in the determination of the direction of travel of the motor vehicle and/or is allowed to be included in the determination of the direction of travel.

In the event of deactivation of the ignition of the motor vehicle, at least the sequence data record generated last is stored by the electronic control unit so that said sequence data record is immediately available as information when the ignition is activated. In particular, after the ignition of the motor vehicle is activated, the sequence data record stored last is used by the method.

The motor vehicle has, in addition to the wheel speed sensor arrangements without detection of the direction of rotation, preferably also or alternatively at least one wheel speed sensor arrangement which can independently determine a direction of rotation of its encoder and therefore essentially a direction of travel. In particular, such a wheel speed sensor arrangement is assigned to a wheel of a nondriven axle. The direction of rotation information of this wheel speed sensor arrangement is particularly preferably taken into account as essentially redundant plausibility-checking information in order to increase the reliability of the method during the calculation of the direction of travel.

The method is expediently additionally carried out in order to increase the reliability in motor vehicles which have other means for determining the direction of travel such as, in particular, wheel speed sensor arrangements for independently detecting the direction of travel of the respective encoder.

The invention also relates to a computer program product for carrying out all the method steps according to aspects of the invention.

The method according to aspects of the invention is provided for use in all types of motor vehicle, that is to say in safety-critical systems which have at least one wheel speed sensor arrangement. This preferably includes passenger cars, trucks, all types of trailers and single-track motor vehicles such as motor cycles. The use of the proposed method is appropriate in particular if low-cost wheel speed sensors are used which cannot carry out independent determination of a direction of rotation. It is particularly preferably provided to use the method according to aspects of the invention for detecting the direction of rotation for an electronic parking aid.

BRIEF DESCRIPTION OF THE DRAWINGS

Further preferred embodiments emerge from the following descriptions of exemplary embodiments with reference to Figures, in which, in a schematic illustration.

DETAILED DESCRIPTION OF THE PREFERRED EMBODIMENTS

Figure 1:
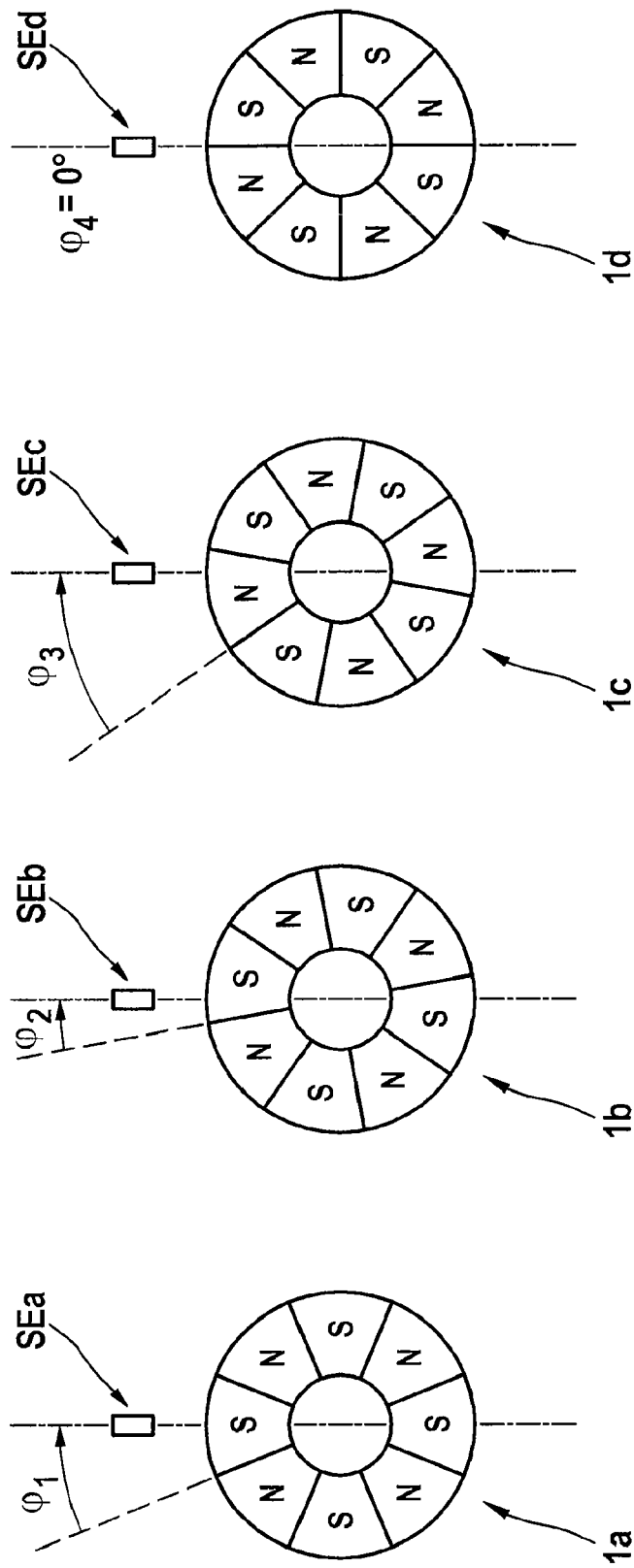
FIG. 1 shows an exemplary arrangement composed of four wheel speed sensor arrangements of a motor vehicle, which illustrates the different encoder positions.

FIG. 1 illustrates by way of example four wheel speed sensor arrangements 1a, 1b, 1c and 1d. These respectively comprise an alternately magnetized encoder and a wheel speed sensor SEa, SEb, SEc, SEd which senses the rotational movements of the encoder. The relative orientation of the rotation $\phi_1$, $\phi_2$, $\phi_3$, $\phi_4$ between the wheel speed sensor SEa, SEb, SEc, SEd and the respective next scale graduation which is to be sensed is respectively different in each wheel speed sensor arrangement. This results in the individual wheel speed sensors sensing a scale graduation at different times within the course of the distance traveled by the motor vehicle, and as a result the speed signals of the individual wheel speed sensor arrangements are generated and transmitted to the electronic control unit ECU at different times. The ECU determines the direction of travel or a possible change in the direction of travel from the order in which the speed signals occur with respect to the individual wheel speed sensor arrangements.

Figure 2:
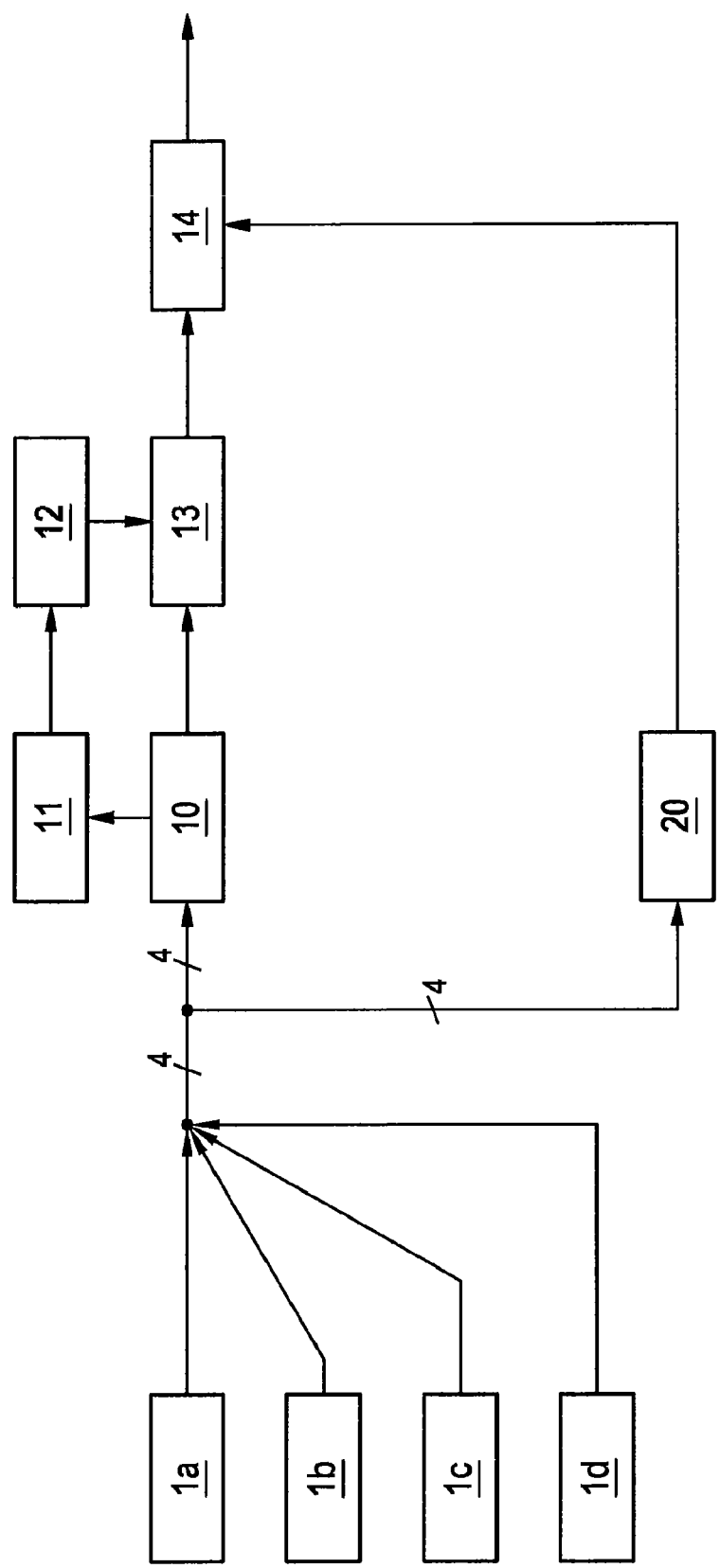
FIG. 2 is a diagram of a method example for detecting the direction of travel by evaluating the order of the speed signals.

FIG. 2 illustrates a method example by means of a diagram. The speed signals of the wheel speed sensor arrangements 1a to 1d are transmitted to the ECU and further processed there in function blocks 10 and 20. In function block 10 a sequence data record, which comprises time stamp data, is generated from the chronological order in which the speed signals of the individual wheel speed sensor arrangements occur. Function block 11 comprises a stored preceding sequence data record and the information relating to the direction of travel assigned to said sequence data record. In each case, a forward sequence data record and a reverse sequence data record are generated from this preceding sequence data record in function block 12. Said sequence data records are respectively compared in function block 13 with the current sequence data record by means of a correlation calculation, wherein in each case a correspondence characteristic variable, for example a correlation coefficient, is calculated. These two correspondence characteristic variables are evaluated in function block 14 in order to determine the direction of travel. When the direction of travel is determined, the result of a stationary state detection of the function block 20, in which a possible stationary state of the vehicle is detected from the speed signals, is also taken into account here. The detection of the direction of travel of the function block 14 can as a result identify a detected forward travel or reverse travel or a stationary state of the vehicle or an undefined travel state.

The undefined travel state can be identified on the basis of insufficient verification of one of the three travel states specified above.

Figure 3:
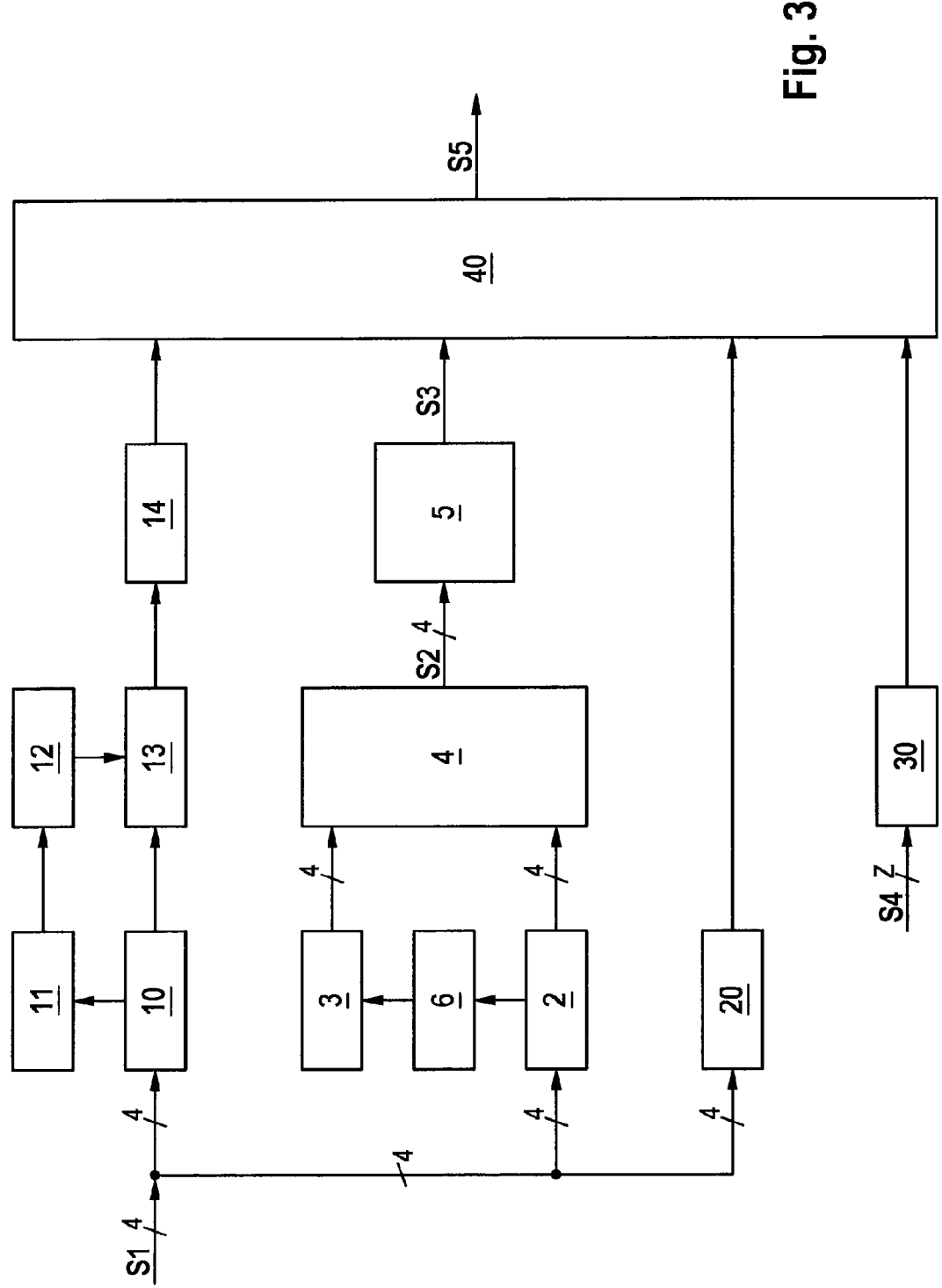
FIG. 3 is an exemplary diagram of a method which has a plurality of branches for the common identification of a direction of travel.

The diagram shown in FIG. 3 illustrates a method example which, based on FIG. 2, has additional method branches for detecting the direction of travel of the motor vehicle. Within the scope of the method example, the direction of travel of the motor vehicle S5 is calculated from an input signal S1 which incrementally makes available four counting signals from four wheel speed sensor arrangements (not illustrated).

S1 is transmitted to function block 10 which determines the chronological order in which the speed signals occur with respect to the individual wheel speed sensor arrangements, for example "RR→FL→FR→RL". In function block 11, the order, for example containing the information "RL→FR→FL→RR" in which the previous counting signals of the individual wheel speed sensor arrangements occur is stored in a memory. In function block 12 an order corresponding to a forward direction of travel "RL→FR→FL→RR" and an order corresponding to a reverse direction of travel "RR→FL→FR→RL" are formed from this preceding order. These two orders are compared with the order from function block 11, that is to say the current order of the sensed counting signals, in a function block 13. On the basis of these two comparisons, a decision about the current direction of travel is made in function block 14. This decision can result in a detected forward direction of travel or reverse direction of travel and/or a change in the direction of travel or an undefined detection. This result of the detection of the direction of travel is transmitted to function block 40. According to the example, a reverse direction of travel is detected from the sensed order "RR→FL→FR→RL" and the preceding order, identical thereto, corresponding to a reverse direction of travel.

The detection S3 of the direction of travel from function block 5, which is identified subsequently, is also transmitted to function block 40. In function block 2, a scale graduation error characteristic variable is calculated from each speed signal which is assigned to a sensed scale graduation wheel speed sensor arrangement. Function block 2 makes available the four scale graduation error characteristic variables of the speed signals of all four wheel speed sensor arrangements. Said scale graduation error characteristic variables are transmitted to function block 4 in which a pattern or a sequence of scale graduation error characteristic variables is generated incrementally for the scale graduation error characteristic variables of each encoder. Furthermore, in each case a reference pattern for each wheel speed sensor arrangement is stored in function block 3, wherein this reference pattern comprises, for example, in each case a sequence of scale graduation error characteristic variables assigned to all the scale graduations of the corresponding encoder in the order of a forward rotational movement of the encoder. These four reference patterns are also transmitted to function block 4. In function block 4, the four patterns are each correlated with the corresponding reference pattern of the respective wheel speed sensor arrangements, and the degree of correspondence is determined by means of the calculation of a correspondence characteristic variable between the pattern and the reference pattern. Here, in each case the pattern with a forward rotation reference pattern and a reverse rotation reference pattern which is arranged in a reverse order are compared and in each case a correspondence characteristic variable is calculated. In the event of one of the two correspondence characteristic variables being greater, by a defined relation, than the other correspondence characteristic variable and having a defined minimum value characterizing the degree of correspondence between the respective pattern and the reference pattern, the direction of rotation corresponding to the reference pattern is detected with the greater correspondence with the pattern. If no direction of rotation can be detected, a further scale graduation error characteristic variable is added to the pattern and the previous method steps are repeated. If, in the course of a common rotation of encoders a direction of rotation is detected for each wheel speed sensor arrangement or its pattern in function block 4, these directions S2 of rotation are transmitted to function block 5, which comprises a detection of the direction of travel of the motor vehicle on the basis of a majority decision and makes available the direction of travel information S3 to further functions of the motor vehicle control system and/or systems of the motor vehicle.

In addition, within the scope of the exemplary method, the scale graduation error characteristic variables of the function block 2 are transmitted to a post-learning unit 6 in which the four scale graduation error characteristic variables are filtered, with the result that after transmission to function block 3, in which the reference patterns or scale graduation error reference data for all four wheel speed sensor arrangements are stored, they are included in the reference data with a defined weighting.

In addition, by means of the four speed signals S1 in function block 20, a detection of the stationary state is carried out. The information relating to a possible stationary state of the vehicle from function block 20 is also transmitted to function block 40.

Furthermore, the method example comprises a method branch with function block 30 in which additional information S4, for example a transmission information item as to whether a forward gearspeed or reverse gearspeed is engaged and a steering angle information item are evaluated within the scope of a detection of direction. For example, in addition, in particular within the scope of an alternative example, the detection of direction is identified from the yaw rate ($\Psi'$) and the lateral acceleration ($a_y$) or the yaw rate ($\Psi'$) and the steering angle. From the following formula it is possible, in particular by ignoring the attitude angle $\beta$, to infer the direction of travel by evaluating the sign of the velocity which results from the formula:

$$v = a_y * (\Psi' + \beta') = a_y * \Psi'$$

The result of this detection of direction is additionally transmitted to function block 40.

In function block 40, a common evaluation of the direction of travel information which is made available by the function blocks 14, 5 and 30, and of the stationary state information from block 20 is carried out. Here, a defined weighting of the information is performed. At the output of function block 40, the direction of travel S5 is made available, wherein this information about the direction of travel has relatively high reliability and plausibility. S5 is used, for example, at least as an input signal for a parking aid system.

The invention claimed is:

1. A method for detecting a direction of travel or for detecting a change in the direction of travel of a motor vehicle which has at least two wheel speed sensor arrangements which each comprise an encoder with an incremental scale and a plurality of scale graduations and a wheel speed sensor and are connected to an electronic control unit (ECU),
    transmitting a speed signal to the ECU when a scale graduation is sensed by each wheel speed sensor,
    identifying the direction of travel or a change in the direction of travel of the motor vehicle by comparing a present order in which the speed signals are received by the ECU to a forward direction order and a reverse direction order,
    wherein the forward direction order and reverse direction order are determined based on a past order of the speed signals previously received by the ECU and a direction of travel corresponding to the past order, and
    wherein the following steps are carried out in the course of an identification of a direction of travel:
    generating a current sequence data record from the speed signals received last in the electronic control unit,
    generating at least one forward sequence data record, in which data are arranged in accordance with forward travel, and at least one reverse sequence data record, in which data are arranged in accordance with reverse travel, from at least one preceding sequence data record which is stored in the electronic control unit,
    comparing a current sequence data record with both the at least one forward sequence data record and with the at least one reverse sequence data record, wherein, in each case, a correspondence characteristic variable of the current sequence data record with the forward sequence data record and the reverse sequence data record is calculated, and
    carrying out a process for determining the direction of travel by evaluating at least the two correspondence characteristic variables.

2. The method as claimed in claim 1 further comprising the step of generating a sequence data record from an information item relating to a chronological order in which the speed signals of the individual wheel speed sensors occur.

3. The method as claimed in claim 2, wherein the sequence data record comprises time stamp data which are respectively assigned to a chronological occurrence of a speed signal of a wheel speed sensor arrangement.

4. The method as claimed in claim 2, wherein when the direction of travel or a change in the direction of travel is identified, the sequence data record generated last is compared with at least one preceding sequence data record.

5. The method as claimed in claim 1 further comprising the step of calculating the correspondence characteristic variables by a correlation calculation between the current sequence data record and either the forward sequence data record or the reverse sequence data record.

6. The method as claimed in claim 2 further comprising the step of storing the sequence data record generated last in the electronic control unit at defined times, continuously, or both at defined times and continuously.

7. The method as claimed in claim 1, wherein when the direction of travel is determined, at least one of the following additional information items is taken into account:
    a velocity of the vehicle, a transmission information item, a vehicle lighting information item, a yaw rate of the motor vehicle, a lateral acceleration of the motor vehicle, a steering angle information item, information that a defined minimum velocity has been reached as an indication of forward travel, or any combination thereof.

8. The method as claimed in claim 1, wherein a scale graduation error characteristic variable is assigned to a plurality of the scale graduations of the encoder of at least one wheel speed sensor arrangement by evaluating the speed signals of the sensor in an electronic control unit,
    wherein the direction of rotation of the at least one encoder is identified from an order of the scale graduation error characteristic variables which are assigned to sensed scale graduations, after which a direction of rotation of the one at least one encoder is taken into account in a determination of the direction of travel of the motor vehicle.

9. The method as claimed in claim 1, wherein in the course of an identification of a direction of rotation of at least one encoder, scale graduation error characteristic variables are combined to form a pattern which is respectively compared with a forward rotation reference pattern and a reverse rotation reference pattern, which reference patterns are formed directly or indirectly from scale graduation error characteristic variables which are stored in the electronic control unit, wherein, in each case, a pattern correspondence characteristic variable of the pattern is calculated with at least a portion of one of the two reference patterns, after which the direction of rotation of this encoder is determined from a comparison of the two pattern correspondence characteristic variables, and the at least one identified encoder direction of rotation is taken into account in the determination of the direction of travel of the motor vehicle and/or is included in the determination of the direction of travel.

10. A non-transitory computer readable medium including a computer-executable program for carrying out the steps of:
transmitting a speed signal to the ECU when a scale graduation is sensed by each wheel speed sensor,
identifying the direction of travel or a change in the direction of travel of the motor vehicle by comparing a present order in which the speed signals are received by the ECU to a forward direction order and a reverse direction order,
wherein the forward direction order and reverse direction order are determined based on a past order of the speed signals previously received by the ECU and a direction of travel corresponding to the past order, and
wherein the following steps are carried out in the course of an identification of a direction of travel:
generating a current sequence data record from the speed signals received last in the electronic control unit,
generating at least one forward sequence data record, in which data are arranged in accordance with forward travel, and at least one reverse sequence data record, in which data are arranged in accordance with reverse travel, from at least one preceding sequence data record which is stored in the electronic control unit,
comparing a current sequence data record with both the at least one forward sequence data record and with the at least one reverse sequence data record, wherein, in each case, a correspondence characteristic variable of the current sequence data record with the forward sequence data record and the reverse sequence data record is calculated, and
carrying out a process for determining the direction of travel by evaluating at least the two correspondence characteristic variables.

* * * * *